United States Patent [19]

Tsuchiya et al.

[11] Patent Number: 4,694,361
[45] Date of Patent: Sep. 15, 1987

[54] DATA TRANSFER APPARATUS HAVING A SIMPLIFIED CLAMP MECHANISM FOR HOLDING A DISKLIKE RECORD MEDIUM IN PLACE

[75] Inventors: Isamu Tsuchiya, Oume; Tsutomu Kawasaki, Iruma; Yoshiaki Sakai, Higashikurume, all of Japan

[73] Assignee: Teac Corporation, Tokyo, Japan

[21] Appl. No.: 846,921

[22] Filed: Apr. 1, 1986

[30] Foreign Application Priority Data

Apr. 3, 1985 [JP] Japan .............................. 60-49763[U]

[51] Int. Cl.⁴ .......................................... G11B 17/022
[52] U.S. Cl. ........................................ 360/97; 360/99
[58] Field of Search ..................... 360/97, 99; 369/270

[56] References Cited

U.S. PATENT DOCUMENTS 4,602,306 7/1986 Noda ..................................... 360/99
4,630,154 12/1986 Shiraishi et al. ...................... 360/99

FOREIGN PATENT DOCUMENTS 58-77080 5/1983 Japan .

*Primary Examiner*—Robert S. Tupper
*Attorney, Agent, or Firm*—Woodcock Washburn Kurtz Mackiewicz & Norris

[57] ABSTRACT

A clamp assembly is rotatably mounted to the dital end of a clamp arm proximally pivoted to the frame of the apparatus. The clamp arm is pivotable between an unclamping position, where the clamp assembly is away from a motor driven hub to allow the loading and unloading of a flexible magnetic disk in cartridge form, and a clamping position where the clamp assembly engages between itself and the drive hub the magnetic disk in a position for data transfer with a transducer head or a pair of such heads. The clamp arm is sprung from the clamping toward the unclamping position. Operatively engaged at a first end with the clamp arm is a clamp lever which is actuated as by a hand operated clamp knob for moving the clamp arm from the unclamping to the clamping position against the spring force. For simpler construction and easier assemblage, the clamp lever is made of sheet metal and formed to include a support portion bent right angularly from its second end. The support portion of the clamp lever is adapted to loosely but undetachably engage in an aperture or apertures in a flat lever mount rigidly attached to the frame, permitting the clamp lever to pivot substantially about its second end.

7 Claims, 5 Drawing Figures

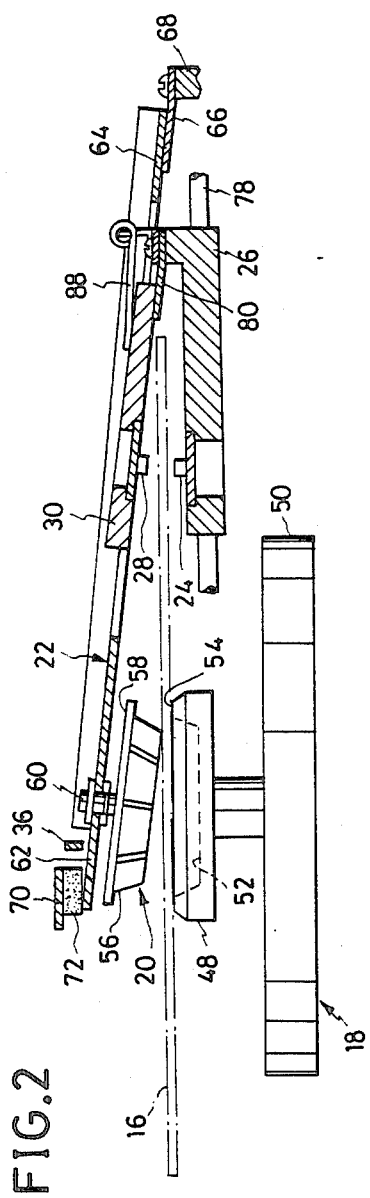
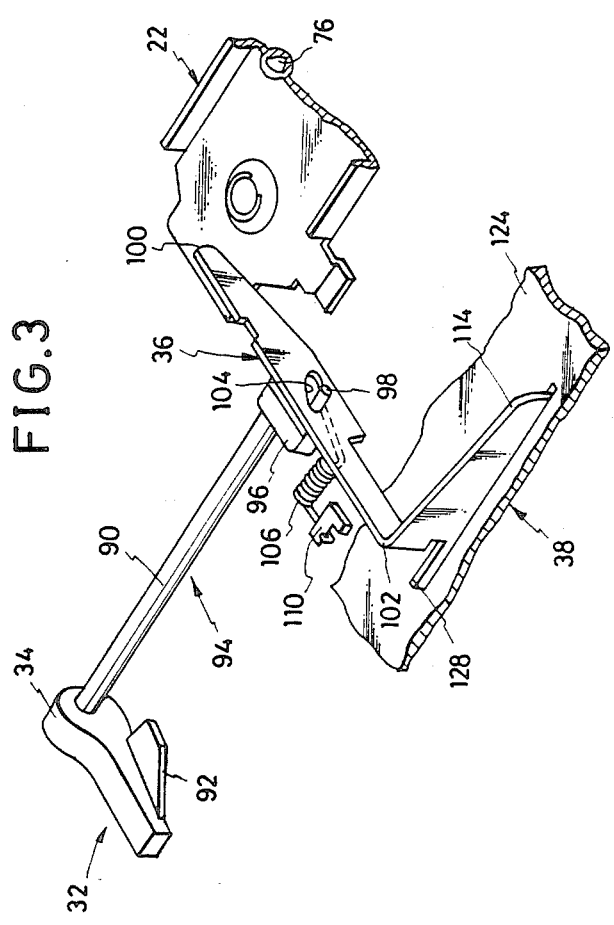

DATA TRANSFER APPARATUS HAVING A SIMPLIFIED CLAMP MECHANISM FOR HOLDING A DISKLIKE RECORD MEDIUM IN PLACE

BACKGROUND OF THE INVENTION

Our invention relates to an apparatus for data transfer with disklike record media, and more specifically to an apparatus for the recording and/or reproduction of coded data with use of interchangeable flexible magnetic disks, or floppy disks according to common parlance, that are used in protective envelopes or jackets to make up disk cartridges. Still more specifically, our invention deals with improvements in such data transfer apparatus of the class having a disk clamp mechanism described and claimed in U.S. Pat. No. 4,602,306.

The disk clamp mechanism according to the noted prior patent application employs a clamp knob pivotally mounted to the front face of the data transfer apparatus and in the vicinity of the disk entrance alot defined therein. Following the insertion of a magnetic disk cartridge in the entrance slot, the clamp knob is turned manually for clamping the disk against the drive hub assembly and, at the same time, for causing the pair of transducer heads to establish data transfer contact with the disk. The clamp knob is linked to a clamp lever which is operatively engaged with the clamp arm which rotatably carries the clamp assembly for moving the same into and out of engagement with the drive hub assembly via the magnetic disk.

We have found a problem with this prior art disk clamp mechanism. As suggested by Noda, the clamp lever has been supported at one end by a pivot pin, with a tubular spacer sleeved upon the pivot pin to hold the clamp lever a required distance from the fixed surface to which the pin is affixed. We object to the pin support of the clamp lever because it makes the assemblage of the clamp mechanism very troublesome and time consuming.

SUMMARY OF THE INVENTION

We have hereby discovered how to simplify the pivotal supporting of the clamp lever in the disk clamp mechanism of the type defined, thereby making materially easier the assemblage of the clamp mechanism. In attaining this objective, moreover, we have succeeded in making less expensive the construction of the clamp lever itself and of its support means.

Our invention may be broadly summarized as a data transfer apparatus having at least one transducer head for data transfer with interchangeable disklike record media, comprising frame means providing a space for the loading and unloading of a record medium to and from a preassigned data transfer position for data transfer with the transducer head. A drive assembly is disposed on one side of, and in a concentric relation with, the record medium when the latter is in the data transfer position. Disposed on the other side of the record medium is a clamp assembly rotatably mounted to a clamp arm which is movable with respect to the frame means between an unclamping position, where the clamp assembly is away from the drive assembly to allow the loading and unloading of the record medium to and from the data transfer position, and a clamping position where the clamp assembly engages between itself and the drive assembly the record medium being held in the data transfer position. The clamp arm is biased by resilient means from the clamping toward the unclamping position. A a clamp lever is operatively engaged at a first end thereof with the clamp arm for moving the same from the unclamping to the clamping position against the bias of the resilient means. Made of sheet metal, the clamp lever is formed to include a support portion bent right angularly from a second end thereof. This support portion of the clamp lever is adapted to undetachably engage in one or more aperatures in a flat lever mount, which is secured to the frame means, so as to allow the pivotal motion of the clamp lever about the second end thereof. A clamp actuating mechanism acts on the clamp lever so as to cause the same to move the clamp arm from the unclamping to the clamping position against the bias of the resilient means.

Even though the clamp lever is not pin supported, its support portion is so engaged in the aperture or apertures in the flat lever mount as to allow the pivotal motion of the clamp lever about its second end. The engagement of the clamp lever support portion with the apertured lever mount is well calculated for the utmost case of assemblage.

Further, being made of sheet metal, the clamp lever is easy to fabricate. The lever mount can also be made of sheet metal and can be adapted to serve purposes other than providing a fulcrum for the clamp lever. Thus the clamp mechanism as a whole is significantly more simplified and made less expensive in construction than heretofore.

The above and other features and advantages of our invention and the manner of realizing them will become more apparent, and the invention itself will best be understood, from a study of the following description and appended claims, with reference had to the attached drawings showing a preferred embodiment of the invention.

BRIEF DESCRIPTION OF THE DRAWINGS

FIG. 2 is a fragmentary vertical section through the apparatus of FIG. 1, showing the drive assembly, clamp assembly, pair of magnetic transducer heads, etc., of the apparatus, the section being taken along the line II—II in FIG. 1;

FIG. 3 is a fragmentary perspective view of the disk clamp mechanism incorporated in the apparatus of FIG. 1;

DESCRIPTION OF THE PREFERRED EMBODIMENT

Figure 1:
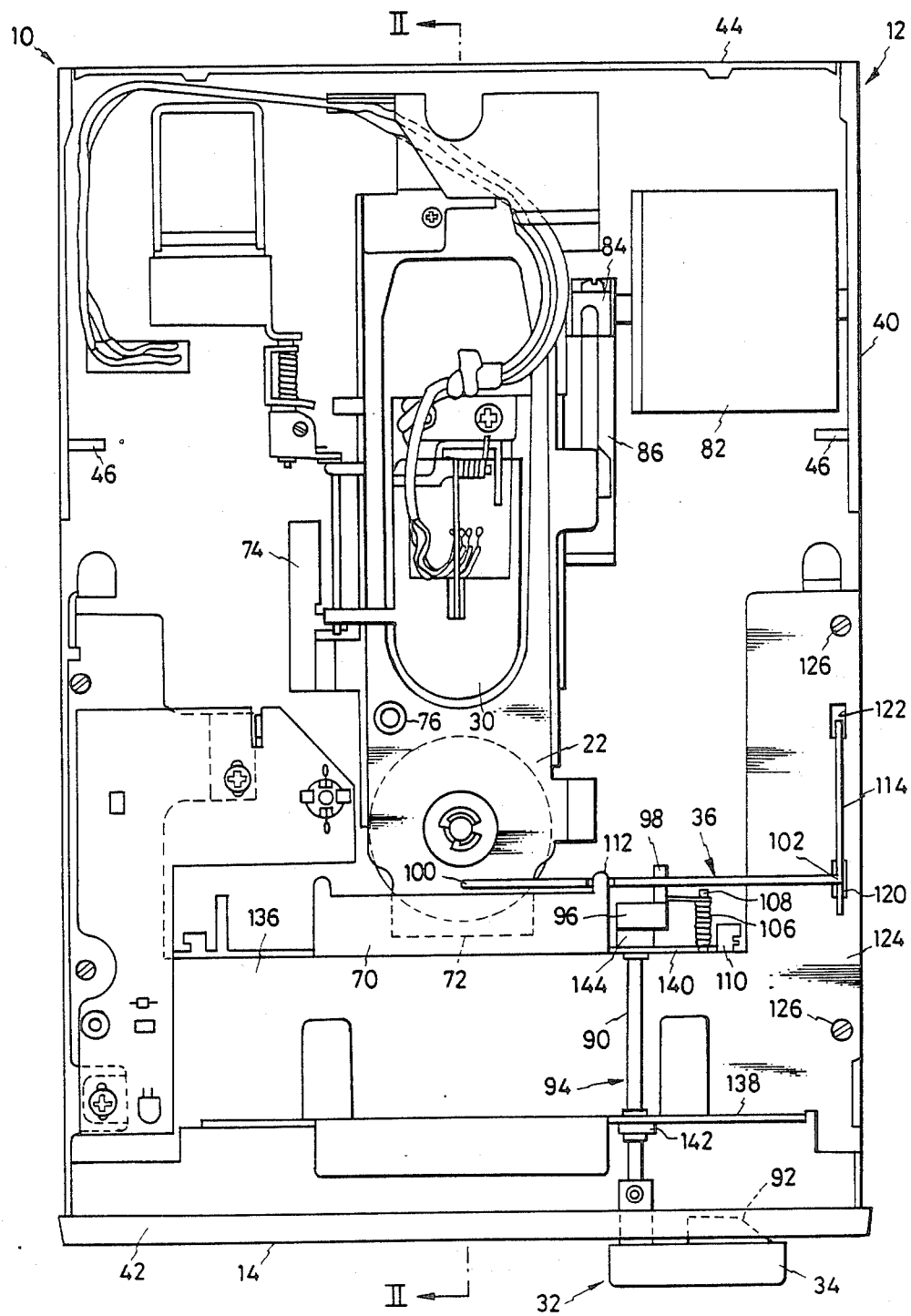
FIG. 1 is a plan of the data transfer apparatus constructed in accordance with our invention, the apparatus being shown with its top cover (not shown) removed to reveal the inner details.

We will now describe the data transfer apparatus of our invention as adapted for use with a double sided flexible magnetic disk cartridge of familiar design, which is disclosed in the noted patent application Ser.

No. 434,400. Generally designated 10 in FIG. 1, the exemplified data transfer apparatus broadly comprises:

1. A generally boxlike housing or frame 12 accommodating various working parts of the apparatus hereinafter set forth and having an entrance slot, not seen, defined in its front face 14 for the insertion and withdrawal of the flexible magnetic disk cartridge shown by the phantom outline in FIG. 2 and therein designated 16.

2. A drive assembly 18, FIG. 2, mounted within the housing 12 for imparting rotation to the flexible magnetic disk of the disk cartridge 16 in a preasigned data transfer position therefor, in which position we have shown the disk cartridge in FIG. 2.

3. A clamp assembly 20 disposed opposite the drive assembly 18 and rotatably mounted to a pivotal clamp arm 22 for movement therewith into and out of clamping engagement of the magnetic disk of the disk cartridge 16 against the drive assembly.

4. A first or lower magnetic transducer head 24, FIG. 2, disposed under the disk cartridge 16 being held in the data transfer position for data transfer contact with the lower face of the magnetic disk and mounted directly on a carriage 26 thereby to be transported radially of the magnetic disk.

5. A second or upper magnetic transducer head 28 disposed over the disk cartridge 16 being held in the data transfer position, and mounted on a head arm 30, pivoted on the carriage 26, thereby to be moved into and out of data transfer contact with the upper face of the magnetic disk.

6. A clamp actuating mechanism 32, FIGS. 1 and 3, including a clamp knob or lever 34 for manually activating the clamp assembly 20 into and out of clamping engagement with the drive assembly 18 via the disk cartridge 16.

7. A clamp lever 36, FIGS. 1, 3, 4 and 5, operated by the clamp actuating mechanism 32 and acting on the clamp arm 22 for the desired movement of the clamp assembly 20 into and out of clamping engagement with the drive assembly 18.

8. Pivotal support means 38, FIGS. 3, 4 and 5, for pivotally supporting the clamp lever 36 in a manner easy of assemblage.

We will hereinafter discuss in more detail the above listed housing 12, drive assembly 18, clamp assembly 20, transducer heads 24 and 28, clamp actuating mechanism 32, clamp lever 36, and clamp lever support means 38, in that order. We will divide the detailed discussion of these components under the respective headings.

HOUSING

With reference to FIG. 1 the housing 12 of the data transfer apparatus 20 comprises a frame 40, a front wall 42 and a rear wall 44, which may all be aluminum die castings and which are all combined into a generally flat, boxlike shape. The front wall 42 provides the aforesaid front face 14 in which there is defined the unseen entrance slot for the insertion and withdrawal of the disk cartridge 16 to and from the data transfer position indicated by the dashed lines in FIG. 2. Inserted fully into and through the entrance slot, the disk cartridge 16 reaches the data transfer position on butting on a pair of stops 46 shown in FIG. 1.

DRIVE ASSEMBLY

As shown in FIG. 2, the drive assembly 18 includes a drive hub 48 which is therein shown mounted directly on the output shaft of a disk drive motor 50. The disk drive motor 50 rotates the drive hub 48 about the same axis as the magnetic disk of the disk cartridge 16 being held in the data transfer position. The drive hub 48 has a conical socket 52 formed in its top surface for engagement with the clamp assembly 20 in a manner yet to be described. The annular top surface 54 of the drive hub 48, left around the socket 52, is intended for direct contact with the annular central portion of the magnetic disk of the disk cartridge 16 which is exposed through its protective envelope.

CLAMP ASSEMBLY

As shown also in FIG. 2, the clamp assembly 20 lies on the opposite side of the disk cartridge 16, when the latter is in the data transfer position, with respect to the drive assembly 18. The clamp assembly 20 includes a conical collet 56, complete with a flange or shoulder 58, rotatably mounted on a spindle 60 on the distal end 62 of the clamp arm 22. The clamp arm 22 is supported at its proximal end 64 by a cantilever spring 66 on a ledge 68 formed on the rear wall of the housing 12. So supported, the clamp arm 22 is pivotable between an unclamping position of FIG. 2, where the collet 56 is away from the drive hub 48, and a clamping position where the clamp assembly 20 clamps the magnetic disk against the drive assembly 18. The cantilever spring 66 serves the purpose of biasing the clamp arm 22 from the clamping toward the unclamping position, in addition to that of hingedly mounting the clamp arm on the ledge 68.

When the clamp arm 22 is pivoted in a clockwise direction, as viewed in FIG. 2, under the bias of the cantilever spring 66, its distal end 62 comes into abutment against an overhead stop 70 via a piece of rubber or like elastic material 72 bonded to its underside, thereby limiting the clockwise turn of the clamp arm 22 the unclamping position of FIG. 2. With the clamp arm 22 thus held in the unclamping position, the clamp assembly 20 is spaced from the drive assembly 18 a sufficient distance to permit the insertion of the disk cartridge 16 into and through the entrance slot in the housing 12 to the data transfer position.

The clamp arm 22 is to be pivoted from the unclamping to the clamping position, by the clamp actuating mechanism 32 to be detailed subsequently, following the loading of the disk cartridge 16. In the clamping position of the clamp arm 22 represented in FIG. 4, the conical collet 56 of the clamp assembly 20 becomes engaged in the correspondingly shaped socket 52 in the drive hub 48 through the central aperture in the magnetic disk. Also, in this clamping position, the flange 58 on the collet 56 holds the exposed annular portion of the magnetic disk against the annular top surface 54 of the drive hub 48. Thus is the magnetic disk captured fast between drive hub 48 and collect 56, so that the disk can be revolved within its envelope upon rotation of the disk drive motor 50.

Preferably, for the desired lower manufacturing cost of the data transfer apparatus 10, the clamp arm 22 takes the form of a sheet metal pressing, as will be noted from FIG. 2. The sheet metal clamp arm 22 is formed to include a disk cartridge retainer arm 74 and protuberance 76, both shown in FIG. 1. The retainer arm 74 has a piece of sponge, not shown, cemented to its underside for holding lightly against the disk cartridge 16 in the data transfer position, whereas the protuberance 76 functions to positively retain the disk cartridge against upward displacement.

MAGNETIC TRANSDUCER HEADS

Referring again to FIG. 2 in particular, we will briefly explain the magnetic transducer heads 24 and 28 as well as means more or less directly associated therewith. The lower transducer head 24 is spring mounted on the carriage 26. The carriage 26 is slidably mounted on a pair of guide rails 78, one seen, extending radially of the magnetic disk of the disk cartridge 16 being held in its data transfer position, or in the direction in which the disk cartridge is inserted in and withdrawn from the apparatus 10.

The upper transducer head 28, on the other hand, is spring mounted to the head arm 30. The head arm 30 is hingedly mounted on the carriage 26 via a cantilever spring 80 effective to urge the upper transducer head 28 toward the lower transducer head 24. It is thus seen that both lower 24 and upper 28 transducer heads are movable radially of the magnetic disk of the disk cartridge 16 being held in the data transfer position, for accessing the individual tracks on the opposite faces of the disk.

Adopted for such travel of the transducer heads 24 and 28 is a head transport motor 82, FIG. 1, of the electric stepping type having a pulley 84 nonrotatably mounted on its output shaft. A steel belt 86 is conventionally looped about the pulley 84 and has its opposite ends anchored to the carriage 26. Of course, we could employ other types of rotary to linear converters such as a lead screw or a rack and pinion arrangement.

Hingedly mounted as above on the carriage 26, the head arm 30 is pivotable toward and away from the carriage 26. The head arm 30 when held away from the carriage 26 as in FIG. 2 holds the upper transducer head 28 away from the lower transducer head 24. On being pivoted toward the carriage 26, then, the head arm 30 urges the upper transducer head 28 against the lower transducer head 24 via the magnetic disk slidably engaged therebetween, with the consequent establishment of data transfer contact between magnetic disk and both transducer heads. A torsion spring 88 coacts with the cantilever spring 80 to bias the head arm 48 from the retracted toward the working position.

Normally, despite the forces of the springs 80 and 88, the head arm 30 is held away from the carriage 26 as in FIG. 2. The head arm 30 is allowed to move toward the carriage 26 when the clamp arm 22 is pivoted from the unclamping to the clamping position by the clamp actuating mechanism 32 detailed in the following chapter.

CLAMP ACTUATING MECHANISM

The clamp actuating mechanism 32 shown in FIGS. 1 and 2 includes the clamp knob or lever 34 disposed on the front face 14 of the housing 12. The clamp knob 34 is rigidly mounted at one end on a rotary shaft 90, disposed immediately above the unseen entrance slot in the front face 14 of the housing 12, for pivotal motion between a disengaging position of FIGS. 1 and 3 and an engaging position angularly displaced approximately 90 degrees from the disengaging position. When in the disengaging position, the clamp knob 34 is oriented approximately parallel to the entrance slot, holding the clamp arm 22 in the unclamping position under the force of the cantilever spring 66 as in FIG. 2. The clamp knob 34 when in this disengaging position allows the insertion and withdrawal of the disk cartridge 1628 into and out of the entrance slot 24.

When turned approximately 90 degrees in a counterclockwise direction, as viewed in FIG. 3, from the disengaging to the engaging position, the clamp knob 34 causes the clamp arm 22 to pivot from the unclamping to the clamping position against the force of the cantilever spring 66. In this engaging position the clamp knob 34 extends across the entrance slot and so blocks the same against the inadvertent forced withdrawal of the disk cartridge 16 or against the insertion of another disk cartridge.

As clearly seen in FIG. 3, the clamp knob 34 has a push cam 92 protruding rearwardly, or toward the housing 12, therefrom and generally extending longitudinally of the clamp knob. The push cam 92 will serve no useful purpose at all if the disk cartridge 16 is manually inserted fully into the entrance slot, that is, into abutment against the pair of limit stops 46. The user may, however, incompletely insert the disk cartridge 16. Then, upon subsequent manipulation of the clamp knob 34 from the disengaging to the engaging position, the push cam 92 will slidingly engage the trailing edge of the partly protruding disk cartridge 16 and will push the same fully into the entrance slot.

The clamp knob 34 is coupled to the clamp lever 36 via a linkage 94 seen in both FIGS. 1 and 3. This linkage functions to cause the pivotal motion of the clamp lever 36 in response to the manual activation of the clamp knob 34 between the engaging and disengaging positions. The linkage 94 comprises:

1. The noted rotary shaft 90 having the clamp knob 34 rigidly mounted on its front end and extending in the direction in which the disk cartridge 16 is to be manipulated into and out of the entrance slot.

2. A crank web 96 on the rear end of the rotary shaft 90.

3. A crankpin 98 projecting from the crank web 96 in an offset relation to the rotary shaft 90.

CLAMP LEVER

Although we have introduced the clamp lever 36 as an independent component of the data transfer apparatus 10 for the purposes of our present invention, it could, indeed, be classified under the clamp actuating mechanism 32 or under its linkage 94. We will therefore discuss the operation of the clamp actuating mechanism 32 in some more detail in connection with the clamp lever 36, with reference directed also to FIGS. 1 and 3.

Extending at right angles with the clamp arm 22, the clamp lever 36 has its first or distal end 100 disposed in overlying relation to the clamp arm. The second or proximal end 102 of the clamp lever 36 is pivotally supported by the improved means 38 in accordance with our invention, as will be detailed subsequently. A slot 104 is formed in the midportion of the clamp lever 36 and extends approximately longitudinally thereof. Slidably engaged in the slot 104 is the crankpin 98 constituting the final member of the linkage 94 of the crank actuating mechanism 32. A torsion spring 106, coiled about a fixed, headed pin 108, has one of its arms engaged with the crankpin 98 and the other arm with a fixed lug 110, with the result that the clamp knob 34 is biased in a clockwise direction, as viewed in FIG. 3, from the engaging toward the disengaging position. A fixed stop 112, FIG. 1, overlies the clamp lever 36 for limiting its pivotal motion in the position of FIG. 3, where the clamp lever holds the clamp arm 22 in the unclamping position of FIG. 3 under the force of the cantilever spring 66.

Thus, with the manual turn of the clamp knob 34, the crankpin 98 slides along the slot 104 in the clamp lever 36 thereby causing the pivotal motion of the clamp lever about its second end 102. The slot 104 is longitudinally dimensioned to limit the sliding movement of the crankpin 98 in the engaging and disengaging positions of the clamp knob 34. As the clamp knob 34 extends horizontally in its disengaging position as in FIGS. 1 and 3, so does the crank web 96 on the rotary shaft 90. Then the crankpin 98 lies at the left hand extremity, as seen in FIG. 3, of the slot 104, with the result that the clamp lover 36 extends approximately horizontally under the influence of the torsion spring 106. The clamp arm 22 is then in the unclamping position of FIG. 2, with its distal end 62 abutting against the overhead stop 70 via the rubber 72 under the force of the cantilever spring 66

The crankpin 98 will slide along the slot 104 in the clamp lever 36 as the the clamp knob 34 is turned from the disengaging toward the engaging position against the force of the torsion spring 106. Then, in the engaging position of the clamp knob 34, the crankpin 98 will hit the right hand extremity, as seen in FIG. 3, of the slot 104, thereby pivoting the clamp lever 36 in a clockwise direction as viewed in the same figure. Now the clamp knob 34 and the crank web 96 are both oriented perpendicularly, that is, parallel to the plane along which the clamp arm 22 swings between the clamping and unclamping positions. So pivoted, the clamp lever 36 will cause the clamp arm 22 to turn from the unclamping to the clamping position against the bias of the cantilever spring 66, with the result that the inserted disk cartridge 16 has its magnetic disk caught between drive hub 48 and collet 56.

Concurrently with the above clamping of the magnetic disk, the head arm 30 will also be pivoted in a counterclockwise direction, as viewed in FIG. 2, for the establishment of data transfer contact between magnetic disk and both transducer heads 24 and 28.

CLAMP LEVER SUPPORT MEANS

Figure 4:
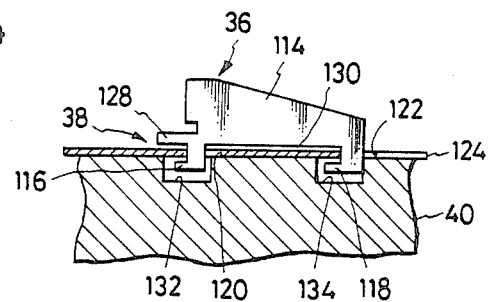
FIG. 4 is a fragmentary vertical section through the disk clamp mechanism of FIG. 3, showing the way in which the clamp lever is pivotally mounted in accordance with our invention.
Figure 5:
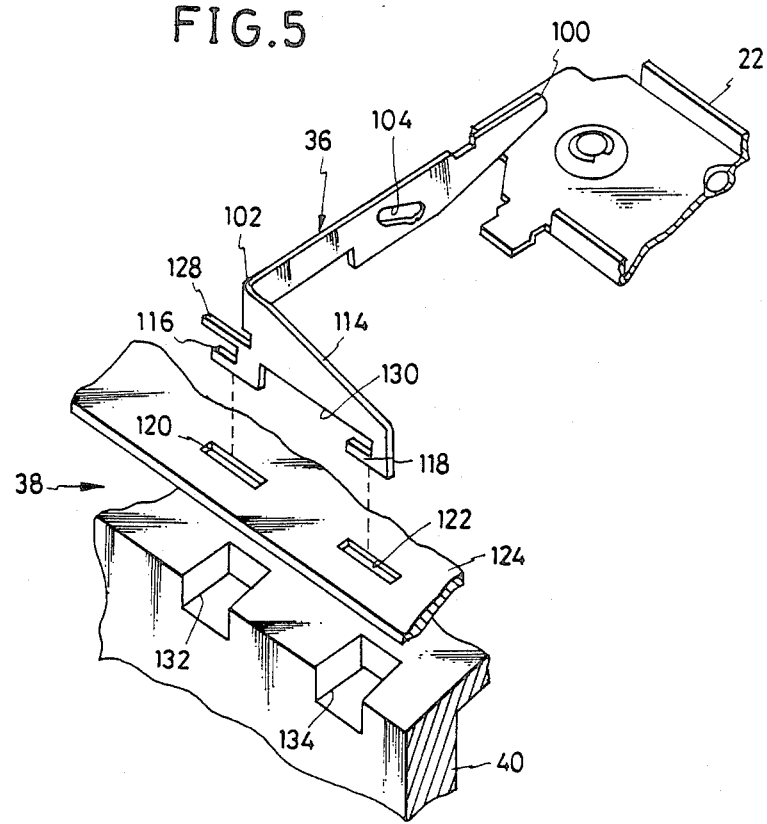
FIG. 5 is a fragmentary, exploeded perspective view of the clamp arm, clamp lever, lever support, and associated part of the frame or housing of the apparatus, which are all included in the disk clamp mechanism of FIG. 3.

Having thus made clear the functions of the clamp lever 36, we will proceed to the discussion of how the clamp lever is pivotally supported by the clamp lever support means 38, with reference directed principally to FIGS. 4 and 5, although such means appear also in FIGS. 1 and 3. The clamp lever 36 has a support portion 114 bent right angularly from its second end 102, in a direction away from the clamp knob 34. The clamp lever support portion 114 has first 116 and second 118 L shaped hooks depending from its opposite ends. We recommend that the clamp lever 36 with its support portion 114 and hooks 116 and 118 be integrally made of sheet metal for the reduction of the manufacturing cost. The hooks 116 and 118 can be in coplanar relation to the clamp lever support portion 114.

The hooks 116 and 118 are somewhat loosely engaged respectively in first 120 and second 122 slotlike apertures in a flat lever mount 124. As will be seen also from FIG. 1, the lever mount 124 is placed upon the frame 40 and fastened thereto as by screws 126. The apertures 120 and 122 in this lever mount are each elongated, and are aligned with each other, in the longitudinal direction of the clamp lever support portion 114. The lengths of the apertures 120 and 122 are so determined as to allow the insertion of the hooks 116 and 118 therethrough.

FIG. 4 clearly indicates that the first hook 116 is inserted in the first aperture 120 to an extent determined by a limit stop 128 formed in one place with the first hook. The second hook 118 is inserted in the second aperture 122 to the same extent, as determined by the bottom edge 130 of the clamp lever support portion 114. On being inserted in and through the apertures 120 and 122, the hooks 116 and 118 are received in recesses 132 and 134, respectively, formed in the frame 40. The recesses 132 and 134 are offset from the apertures 120 and 122, respectively, to an extent necessary for preventing the disengagement of the hooks 116 and 118 from the associated apertures.

We suggest the following method of mounting the clamp lever 36. Before fastening the lever mount 124 to the frame 40, the hooks 116 and 118 of the clamp lever support portion 114 may be inserted fully in the respective apertures 120 and 122 in the lever mount, until the limit stop 128 and the bottom edge 130 of the support portion come to rest on the surface of the lever mount. Then the clamp lever support portion 114 may be slid leftwardly, as seen in FIGS. 4 and 5, of the lever mount 124, with the result that the hooks 116 and 118 engage the lever mount against the detachment of the clamp lever support portion from the lever mount.

Then the lever mount 124 with the clamp lever 36 thereon may be fastened to the frame 40 in position thereon by the screws 126. The hooks 116 and 118 become received in the recesses 132 and 134 upon fastening of the lever mount 124 to the frame 40. Since the recesses 132 and 134 are offset as aforesaid from the apertures 120 and 122, the hooks 116 and 118 are now restrained by the frame 40 from displacement to positions where they are withdrawable from the apertures 120 and 122, as is apparent from FIG. 4. We have now completed the pivotal mounting of the clamp lever 36 on the frame means comprising the frame 14 and the lever mount 124.

The width of each of the apertures 120 and 122 in the lever mount 124 is slightly more than the thickness of the sheet metal of which the clamp lever 36 is made. Further the hooks 116 and 118 are laterally displaceable within the recesses 132 and 134 in the frame 40. Consequently, although engaged with the lever mount 124 against the possibility of detachment, the clamp lever support portion 114 is laterally oscillatable with respect to the lever mount, thereby permitting the pivotal motion of the clamp lever 36 substantially about its second end 102.

We have designed the flat lever mount 124 so that it may serve purposes other than that of pivotally supporting the clamp lever 36. As will be discerned from FIG. 1, the lever mount 124 is formed to include a portion 136 extending parallel to the front wall 42 of the housing 12 and underlying the rotary shaft 90 of the clamp actuating mechanism linkage 94. This portion 136 of the lever mount 124 has a pair of upturned, confronting walls 138 and 140 along its front and rear edges for rotatably supporting the shaft 94 via sleeve bearings 142 and 144.

The lever mount portion 136 is further formed to provide the aforesaid overhead stop 70, shown also in FIG. 2, which determines the unclamping position of the clamp arm 22. It will be recalled from an inspection of FIG. 1 that the overhead stops 70 has the stop 112 extending further rearwardly therefrom for limiting the pivotal motion of the clamp lever 36. Additionally, the lever mount portion 136 is formed in one piece with the headed pin 108, about which the torsion spring 106 is coiled, and the lug 110 engaged with one of the arms of the torsion spring 106.

The lever mount 124 with the many additional means thereon can also be fabricated from sheet metal. Thus the combination of the sheet metal clamp lever 36 and the sheet metal lever mount 124 materially simplifies the construction of the data transfer apparatus 10 and reduces its manufacturing cost.

Although we have shown and described our invention in terms of but one embodiment thereof, we recognize, of course, that our invention is not to be limited by the exact details of this disclosure. A variety of modifications and adaptations will readily occur to one skilled in the art within the broad teaching hereof. For example, instead of restraining the displacement of the hooks 116 and 118 of the clamp lever support portion 114 in the longitudinal direction of the apertures 120 and 122 by the recesses 132 and 134 in the frame 40, protruding stops might be formed on the frame for abutting engagement with the hooks. Also, it is unessential that the clamp lever 36 be pivoted about its second end 102 by the clamp knob 34 or by any other hand operated means. All All these and other alterations of the invention are intended in the foregoing disclosure; therefore, our invention is to be limited only by the terms of the claims which follow.

We claim:

1. A data transfer apparatus having at least one transducer head for data transfer with interchangeable disklike record media, comprising:
   (a) frame means providing a space for the loading and unloading of a record medium to and from a preassigned data transfer position for data transfer with the transducer head;
   (b) a drive assembly disposed on one side of, and in a concentric relation with, the record medium when the latter is in the data transfer position;
   (c) a clamp assembly disposed on the other side of the record medium;
   (d) a clamp arm having the clamp assembly rotatably mounted thereto and movable with respect to the frame means between an unclamping position, where the clamp assembly is away from the drive assembly to allow the loading and unloading of the record medium to and from the data transfer position, and a clamping position where the clamp assembly engages between itself and the drive assembly the record medium being held in the data transfer position;
   (e) resilient means biasing the clamp arm from the clamping toward the unclamping position;
   (f) a clamp lever operatively engaged at a first end thereof with the clamp arm for moving the same from the unclamping to the clamping position against the bias of the resilient means, the clamp lever being made of sheet metal and formed to include a support portion bent right angularly from a second end thereof;
   (g) a flat lever mount rigidly attached to the frame means and having an aperture defined therein;
   (h) the support portion of the clamp lever being adapted to undetachably engage in the aperture in the lever mount so as to allow the pivotal motion of the clamp lever about the second end thereof; and
   (i) a clamp actuating mechanism for acting on the clamp lever so as to cause the same to move the clamp arm from the unclamping to the clamping position against the bias of the resilient means.

2. The data transfer apparatus as recited in claim 1, wherein the aperture in the flat lever mount is a slot, the lever mount further having defined therein a second slot aligned with the first recited slot, with a predetermined spacing therebetween, in the longitudinal direction of the support portion of the clamp lever, and wherein the support portion of the clamp lever has first and second hooks formed in one piece therewith for hooked engagement respectively in the first and second slots in the lever mount, the hooks being engaged in the slots with clearances such that the clamp lever is pivotable about the second end thereof.

3. The data transfer apparatus as recited in claim 2, wherein the frame means has formed therein first and second recesses in partial register respectively with the first and second slots in the lever mount, the first and second hooks of the clamp lever being further engaged respectively in the first and second recesses in the frame means thereby to be restrained from detachment from the first and second slots in the lever mount.

4. The data transfer apparatus as recited in claim 1, wherein the clamp actuating mechanism comprises:
   (a) a clamp knob pivotally mounted to the frame means for manual activation between an engaging position for the engagement of the record medium between the clamp assembly and the drive assembly and a disengaging position for the disengagement of the record medium therefrom; and
   (b) a linkage operatively connecting the clamp knob to the clamp lever for causing the clamp arm to move to the clamping position upon activation of the clamp knob from the disengaging to the engaging position and for causing the clamp arm to move to the unclamping position upon activation of the clamp knob from the engaging to the disengaging position.

5. The data transfer apparatus as recited in claim 4, further comprising a push cam formed on the clamp knob for pushing the record medium fully into the frame means upon activation of the clamp knob from the disengaging to the engaging position.

6. The data transfer apparatus as recited in claim 4, further comprising second resilient means biasing the clamp knob from the engaging toward the disengaging position.

7. The data transfer apparatus as recited in claim 4, wherein the flat lever mount is fabricated from sheet metal and is formed to include portions for supporting the linkage of the clamp actuating mechanism, for limiting the movement of the clamp arm in the unclamping position, and for determining one of the opposite extremes of the pivotal movement of the clamp lever.

* * * * *

UNITED STATES PATENT AND TRADEMARK OFFICE
CERTIFICATE OF CORRECTION

PATENT NO. : 4,694,361

DATED : September 15, 1987

INVENTOR(S) : Tsuchiya et al

It is certified that error appears in the above-identified patent and that said Letters Patent is hereby corrected as shown below:

Column 1, line 21, please change "alot" to --slot--.

Column 5, line 40, please change "coasts" to --coacts--.

Column 6, line 56, please change "colled" to --coiled--.

Column 9, line 21, please delete the first occurrence of the word "All".

Signed and Sealed this

Fifteenth Day of March, 1988

Attest:

DONALD J. QUIGG

Attesting Officer

Commissioner of Patents and Trademarks